(12) United States Patent
Reich

(10) Patent No.: US 11,901,563 B2
(45) Date of Patent: *Feb. 13, 2024

(54) METHOD FOR PRODUCING A BATTERY AND BATTERY

(71) Applicant: Clarios Germany GmbH & Co. KG, Hannover (DE)

(72) Inventor: Tatjana Reich, Neustadt (DE)

(73) Assignee: Clarios Germany GmbH & Co. KG, Hannover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/704,757

(22) Filed: Mar. 25, 2022

(65) Prior Publication Data

US 2022/0216575 A1 Jul. 7, 2022

Related U.S. Application Data

(63) Continuation of application No. 14/896,293, filed as application No. PCT/EP2014/062429 on Jun. 13, 2014, now Pat. No. 11,289,781.

(30) Foreign Application Priority Data

Jun. 14, 2013 (DE) .......................... 102013106206.7

(51) Int. Cl.
*H01M 4/73* (2006.01)
*H01M 4/14* (2006.01)
(Continued)

(52) U.S. Cl.
CPC ............... *H01M 4/73* (2013.01); *H01M 4/14* (2013.01); *H01M 4/16* (2013.01); *H01M 4/84* (2013.01);
(Continued)

(58) Field of Classification Search
CPC ............ H01M 4/73; H01M 4/14; H01M 4/16; H01M 50/541
See application file for complete search history.

(56) References Cited

U.S. PATENT DOCUMENTS

| 6,232,017 B1 | 5/2001 | Tsuchida |
| 2006/0121353 A1 | 6/2006 | Jang |

(Continued)

FOREIGN PATENT DOCUMENTS

| CN | 201936940 U | 8/2011 |
| CN | 202633457 U | 12/2012 |

(Continued)

OTHER PUBLICATIONS

CN 201480033241.4 First Office Action dated Dec. 21, 2016.
(Continued)

*Primary Examiner* — Eugenia Wang
(74) *Attorney, Agent, or Firm* — Boardman & Clark LLP

(57) ABSTRACT

An accumulator having a plurality of electrode plates which are adjacently arranged and form at least one electrode plate stack in the form of a block, wherein each electrode plate comprises a frame having a grid arranged therein and wherein at least the grid is filled with an active mass, and wherein each electrode plate comprises at least one connecting lug protruding beyond the frame, wherein the connecting lugs of same-polarity electrode plates are arranged adjacent to one another in a row, wherein the connecting lugs adjacently arranged in a row are materially bonded together electrically and mechanically into a connecting lug block by at least one weld or solder point arranged between the connecting lugs. Further described is a method for manufacturing an accumulator.

17 Claims, 8 Drawing Sheets

(51) Int. Cl.
 H01M 50/541 (2021.01)
 H01M 4/16 (2006.01)
 H01M 4/84 (2006.01)

(52) U.S. Cl.
 CPC ...... H01M 50/541 (2021.01); *H01M 2220/20* (2013.01)

(56) References Cited

U.S. PATENT DOCUMENTS

| | | |
|---|---|---|
| 2007/0111089 A1 | 5/2007 | Swan |
| 2009/0103242 A1 | 4/2009 | Buiel |
| 2011/0293997 A1 | 12/2011 | Tartaglia |
| 2012/0219845 A1 | 8/2012 | Chiba |

FOREIGN PATENT DOCUMENTS

| | | |
|---|---|---|
| JP | 05335020 | 12/1993 |
| WO | 2012/132477 | 10/2012 |

OTHER PUBLICATIONS

PCT/EP2014/062429 International Search Report and Written Opinion dated Sep. 4, 2014.
Machine translation of JP 05-335020 (Dec. 1993).

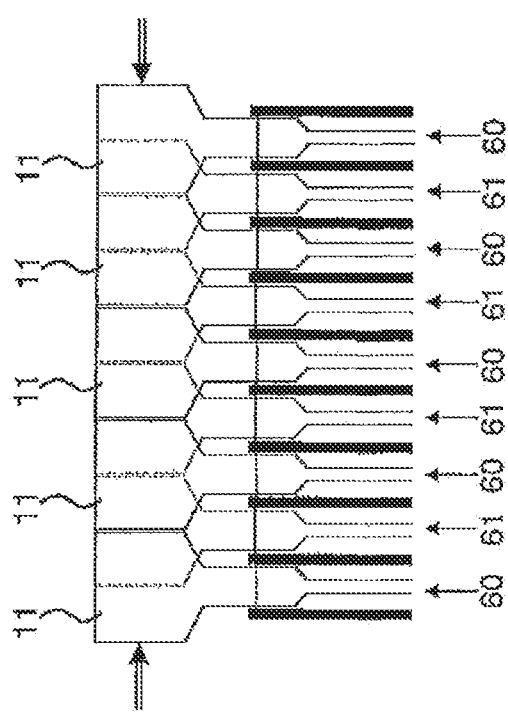
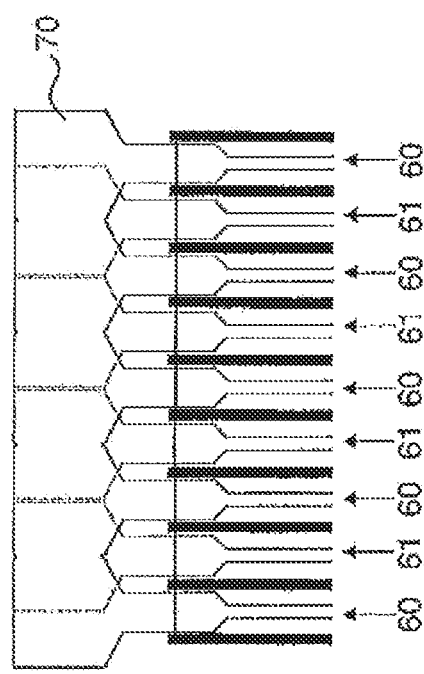

METHOD FOR PRODUCING A BATTERY AND BATTERY

CROSS REFERENCE TO RELATED APPLICATIONS

This application is a Continuation of application Ser. No. 14/896,293 entitled "A METHOD FOR PRODUCING A BATTERY AND BATTERY", filed Jun. 13, 2014, now U.S. Pat. No. 11,289,781, which is a national phase application of PCT/EP2014/062429, entitled "BATTERY AND METHOD FOR PRODUCING A BATTERY", filed Jun. 13, 2014.

BACKGROUND

The invention relates to an accumulator having a plurality of electrode plates. The invention further relates to a method for manufacturing an accumulator.

The invention in particular relates to the field of lead-acid batteries as for example used for motor vehicle starter batteries. Such accumulators consist of a plurality of series-connected galvanic cells separated from one another by an electrically insulating partition. Each of the galvanic cells thereby comprises an electrode plate stack in the form of a block, in which negative and positive electrode plates are alternatingly arranged side by side. The individual electrode plates are connected together in parallel. To this end, the connecting lugs of electrode plates having the same polarity are connected together for example by a so-called battery cell connector (also referred to as a terminal connector) being molded thereon in a lug casting process. This process is described in e.g. DE 10 2009 014 116 B3 and DE 10 2007 022 246 A1. The battery cell connector is thereby placed from above onto the connecting lugs arranged at specific distances from one another and connected to same.

Because of the high currents of such accumulators and the potentially resultant high temperatures, the battery cell connector needs to be of relatively substantial design. The battery cell connector is usually made from lead such that its considerable structure is relatively heavy. In addition, the raw materials, particularly lead, are comparatively expensive.

The invention is thus based on the task of specifying a generic accumulator which is able to be more cost-effectively manufactured as well as being lighter. To be further specified is a corresponding method for manufacturing an accumulator by means of which lighter and more cost-effective accumulators can be produced.

This task is solved in accordance with claim 1 by an accumulator having a plurality of adjacently arranged electrode plates which form at least one electrode plate stack in the form of a block, whereby each electrode plate comprises a frame having a grid arranged therein and whereby at least the grid is filled with an active mass, and whereby each electrode plate comprises at least one connecting lug protruding beyond the frame, wherein the connecting lugs of same-polarity electrode plates are arranged adjacent to one another in a row, whereby the connecting lugs arranged adjacent each another in a row are materially bonded together electrically and mechanically into a connecting lug block by at least one weld or solder point arranged between the connecting lugs. The connecting lugs thereby fuse into the connecting lug block, whereby weld or solder points are formed between the connecting lugs. This fusing can be realized for example by electrode welding.

The invention thus surprisingly makes it possible to entirely eliminate the battery cell connector previously set onto the connecting lugs and instead electrically and mechanically connect the connecting lugs arranged adjacent each another in a row into a connecting lug block, and do so by means of at least one weld or solder point arranged between the connecting lugs. Forming the connecting lug block can furthermore ensure the accumulator has a high current-carrying capacity. Yet significantly less lead is required thereto than in the past since the material of the connecting lugs themselves is used to form the connecting lug block. Any gaps there might be between the connecting lugs can be filled by spacer shims inserted into same to join the connecting lugs into the connecting lug block during the course of welding or soldering. In so doing, the spacer shims do not necessarily have to fill the full width of the gap between the connecting lugs but can instead also be somewhat narrower. In the latter case, the connecting lugs can for example first be somewhat mechanically compressed by welding tongs pressed against the respective outer connecting lugs as part of a welding process and thereby deformed toward one another. The deformability of the connecting lugs allows compensating for certain intervening gaps. Depending on the thickness of the electrode plates, the connecting lug block can also potentially be produced entirely without the cited spacer shims by the connecting lugs being pressed together in line with the above-described principle and then directly welded or soldered to one another.

One advantageous feature of the connecting lug block can therefore encompass the absence of gaps between the connecting lugs in the connecting lug block.

The block-form electrode plate stack can in principle have any given block form, e.g. a prismatic form or a rectangular form. Frame refers to any type of frame used with electrode plates, both a circumferential frame consisting of an upper and a lower frame section as well as a left and a right frame section, as well as also a non-circumferential frame, e.g. a frame only having an upper and a lower frame section.

The invention enables not only optimizing the manufacturing process and thus the costs of an accumulator by the described economizing with respect to the lead which is not used due to omitting the battery cell connector, but it also streamlines the manufacturing process. Joining connecting lugs adjacently arranged in a row into a connecting lug block as described can in fact be realized in substantially easier and more reliable manner than molding a battery cell connector onto the upper edges of the connecting lugs. Moreover, forming the connecting lug block as described results in a sturdier accumulator and one which is immune to vibration.

In many cases, a connecting lug has the same thickness as an electrode plate frame. In addition, the grid arranged within the frame can in many cases also have the same thickness as the frame, although can also be of lesser thickness. However, other thickness ratios are also possible with electrode plates. One advantageous embodiment of the invention provides for the connecting lugs to have a greater thickness in at least one area provided for the forming of the connecting lug block than the frame of the electrode plate. This has the advantage of the greater thickness of the connecting lug completely or at least partially compensating for the above-cited gaps between the connecting lugs so that it is entirely possible in many cases for the connecting lugs to be directly connected into the connecting lug block without the previously cited "gap fillers" in the form of spacer shims. In its area of greater thickness, the connecting lug can be symmetrically or asymmetrically thickened relative to the grid or to the frame respectively.

According to one advantageous further development of the invention, the thickness of the connecting lug is on average twice as great at least in the area of the connecting lug block as the thickness of the electrode plate in the area of the frame after its completion with active mass and necessary coatings, e.g. papier mâché and/or a separator material. The thickened connecting lug enables being able to largely prevent gaps between the connecting lugs in alternating positive and negative electrode plates of substantially identical thickness. The connecting lug block can thus be produced easily and quickly by directly welding or soldering the connecting lugs together.

According to one advantageous further development of the invention, the connecting lugs are materially bonded to one another directly or by way of intermediary material layers arranged between two neighboring connecting lugs. This allows the connecting lug block to be easily and quickly produced by directly welding or soldering the connecting lugs together, hereby further reducing the accumulator's manufacturing costs. The above-cited spacer shims can for example be used as the intermediary material layers.

According to one advantageous further development of the invention, no terminal connector is attached to the end of a connecting lug opposite from the frame; i.e. no battery cell connector serving to connect the electrode plate stack to an adjacent electrode plate stack of another cell of the accumulator, nor a pole body of an external terminal of the accumulator. This can thereby maximize the reduction in lead and thus further optimize the accumulator's costs and weight.

According to one advantageous further development of the invention, a terminal connector serving to connect the electrode plate stack to an adjacent electrode plate stack of another cell of the accumulator or a pole body of an external terminal of the accumulator is materially bonded to the connecting lug block. Thus, as opposed to the prior art, it is advantageous for a terminal connector or a pole body to be connected to the connecting lug block and not to the external ends of the connecting lugs. Doing so thereby allows smaller and lighter terminal connectors/pole bodies to be used than is needed in the case of prior art accumulators. Hence, a terminal connector can for example simply be materially fixed laterally as an extension as it were of the connecting lug block. A pole body can be similarly connected to the connecting lug block, as will be described below referencing example embodiments.

The task initially cited above is further solved according to claim 7 by a method for manufacturing an accumulator in accordance with any one of the preceding claims which comprises the following features:

a) producing at least one electrode plate stack from a plurality of electrode plates by arranging same adjacent one another and forming a block, wherein connecting lugs of same-polarity electrode plates are arranged adjacent to one another in a row, b) mechanically bonding the connecting lugs arranged adjacent each another in a row into a connecting lug block by producing at least one weld or solder point arranged between said connecting lugs.

This thus produces an accumulator having the advantages as described above, in particular low weight and more economical manufacturing costs.

According to one advantageous further development of the invention, the method comprises a material bonding of the connecting lug block to at least one terminal connector which serves to connect the electrode plate stack to an adjacent electrode plate stack of another cell of the accumulator, or at least one pole body of an external terminal of the accumulator.

According to one advantageous further development of the invention, the electrode plates are in each case produced with the frame, the area provided within the frame for the grid and the connecting lug in a casting process. Producing the electrode plates in a casting process allows a streamlined economical manufacture of large quantities of the electrode plates. A continuous casting process, which produces a continuous linear blank, is particularly advantageous.

As part of the casting process, the grid to be created in the frame can either be produced directly; i.e. by means of the mold employed, or a closed material area can first be produced which is then transformed into the desired grid shape in an expanded metal process as will be described below. The grid can then be subsequently filled with the active mass.

According to one advantageous further development of the invention, the casting process comprises the following: Producing a profiled linear blank in a casting process, whereby only by means of the process of casting the linear blank is a greater thickness formed on one or both sides in at least one of the areas which will ultimately form the frame and/or connecting lug than in areas which will ultimately form the grid. This has the advantage of the connecting lugs being able to be produced at the same time as the advantageous increased thickness at least in the area where same will be connected into the connecting lug block in a simple process and one that entails no additional costs. A specific synergy thereby arises between the inventive aspect to the joining of the connecting lugs into the connecting lug block and the described casting process since the casting process itself already allows a particularly economical manufacture of the electrode plates and also equally comprises the basis for particularly effective joining of the connecting lugs into the connecting lug block with no extra costs.

According to one advantageous further development of the invention, the grid is produced in an expanded metal process following the above-cited casting process, thereby further economizing the manufacture of the electrode plates.

BRIEF DESCRIPTION OF THE DRAWINGS

The following will reference drawings in describing the invention in greater detail based on example embodiments. Shown are:

FIG. 6 adjacently arranged electrode plates prior to the connecting lug block being formed;

FIG. 7 the electrode plates according to FIG. 6 after the connecting lug block being formed:

DETAILED DESCRIPTION

Figure 1:
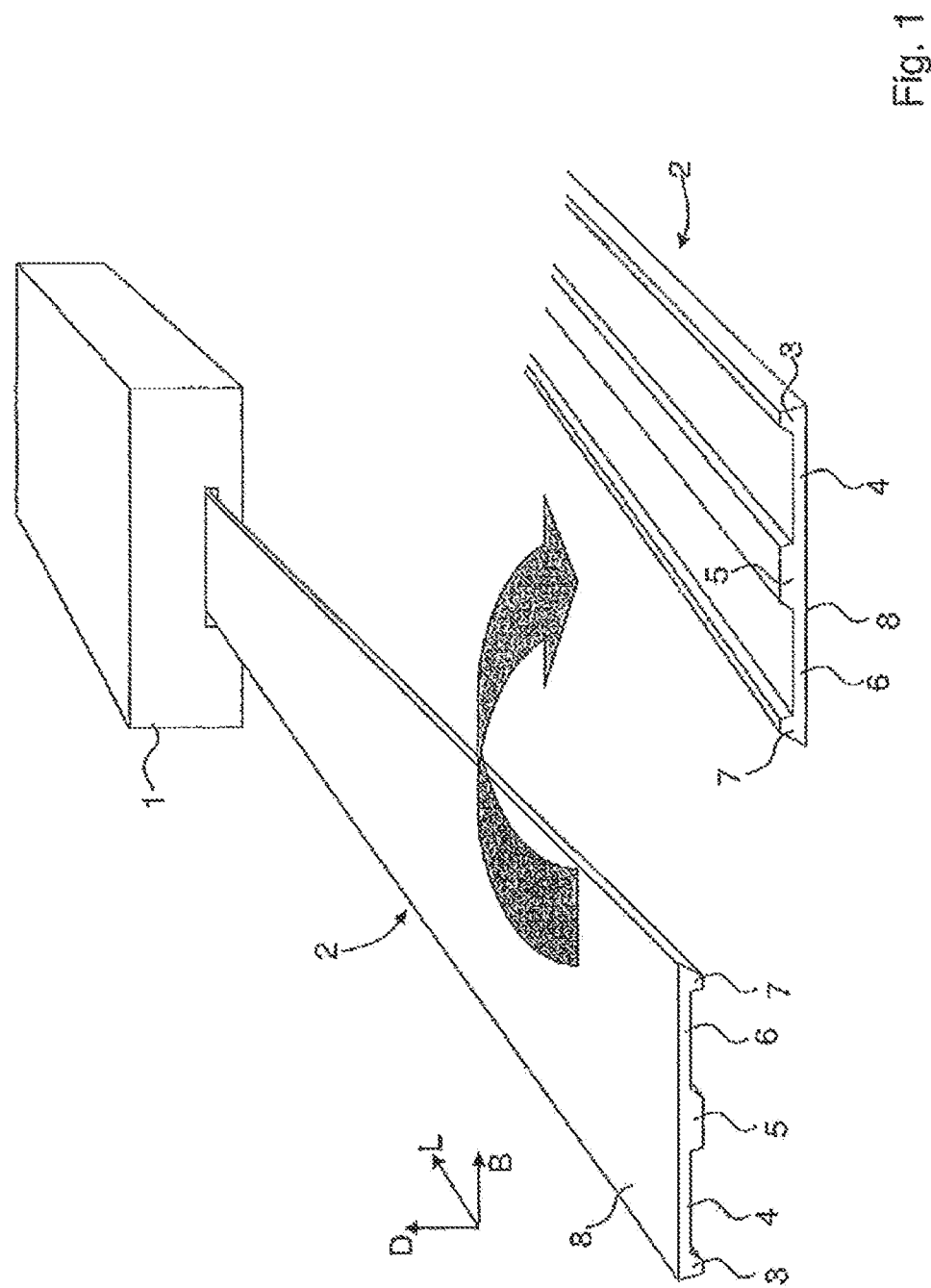
FIG. 1 the manufacturing of a linear blank.

The figures use the same reference numerals for comparable elements.

FIG. 1 shows a casting machine 1 which produces a linear blank 2 for electrode plates of lead-acid batteries in a continuous casting process. Lead is fed into the casting machine 1 on the input side (not shown). The casting machine 1 melts the lead and dispenses it on the output side over a profiled continuous mold as a linear blank 2 in the extruded form depicted in FIG. 1. The linear blank 2 can then be further processed as will be described below.

The distinctiveness to the casting machine 1 according to FIG. 1 lies in the linear blank 2 being produced with a one-sided profile such that the blank 2 has different thicknesses D when viewed across width B. The linear blank 2 can also be produced with a profile on both sides such that the blank 2 has different thicknesses D on the two sides when viewed across width B. It can be recognizable in FIG. 1 that the blank 2 emerging from the casting machine 1 has a substantially flat, smooth upper surface 8 and a profiled lower surface. The blank 2 exhibits regions 3, 5, 7 of greater thickness D than the regions 4, 6 in between. The regions 3, 5, 7 of greater thickness D protrude from the lower surface in relation to the regions 4, 6. On the right, FIG. 1 shows a detail of the linear blank 2 which has been turned 180° about its longitudinal axis so as to show the profiled lower surface, illustrating the one-sided profile structure of the linear blank 2 extending in the longitudinal direction L.

Depending on embodiment, the greater thickness D can also be limited to just the middle region 5.

The casting machine 1 is thereby designed entirely without an extruding unit; i.e. it realizes solely a casting process without any extrusion step.

As will be described below, the regions 4, 6 of lesser thickness are transformed into the grid-like regions in an expanded metal process; the upper and lower frame elements as well as part of the contact lugs of the electrode plates being produced from the regions 3, 5, 7 of greater thickness.

Figure 2:
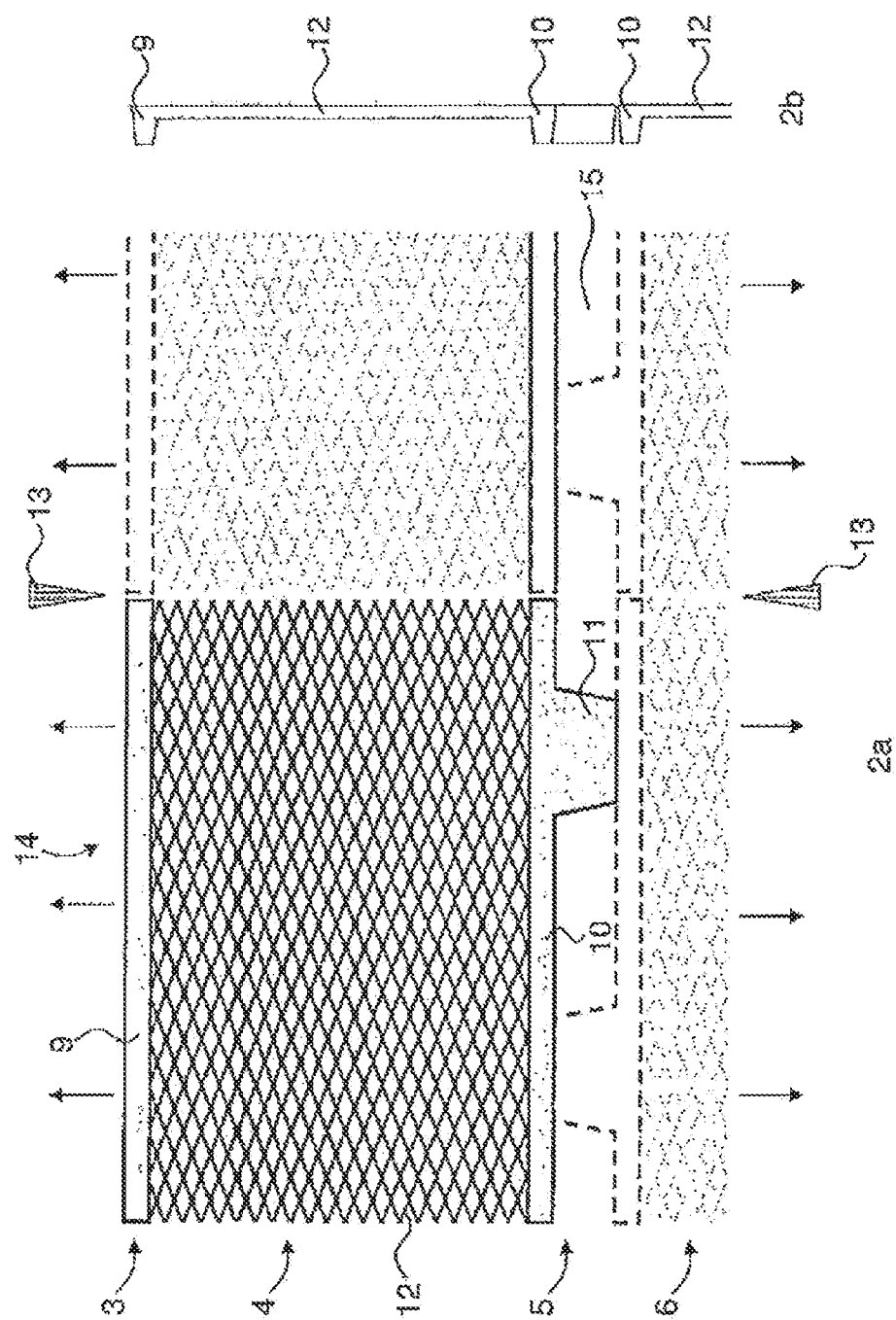
FIG. 2 an electrode plate.

FIG. 2 shows (in FIG. 2a) a plan view of an electrode plate 14 subsequent the expanded metal process. The electrode plate 14 is depicted to illustrate the relationship of the linear blank 2 to further electrode plates which are only partially reproduced at lower contrast or by means of broken lines.

As can be seen, the electrode plate 14 comprises an upper frame element 10 with a contact lug 11 molded thereon, a lower frame element 9, and a grid-like region 12 extending between the upper and the lower frame element 9, 10. To illustrate the relationship to the linear blank 2 according to FIG. 1, the corresponding FIG. 1 reference numerals for the regions of the blank 2 are additionally included.

The respective arrows shown in FIG. 2a pointing away from the upper frame element 10 and the lower frame element 9 indicate in which direction stretching force is applied to the electrode plates 14 in the expanded metal process.

Individual electrode plates 14 are separated from the electrode strip which emerges subsequent the expanded metal process by the individual electrode plates being cut off, as represented by the triangles 13 in FIG. 2a. The contact lugs 11 are also correspondingly cut from the upper frame element 10 of the respective opposite electrode plate. The interstices 15 between the contact lugs 11 are produced by being punched out.

FIG. 2 shows (in FIG. 2b on the right) a side view of the manufactured electrode plate 14, from which the profile structure can be recognized.

Figure 3:
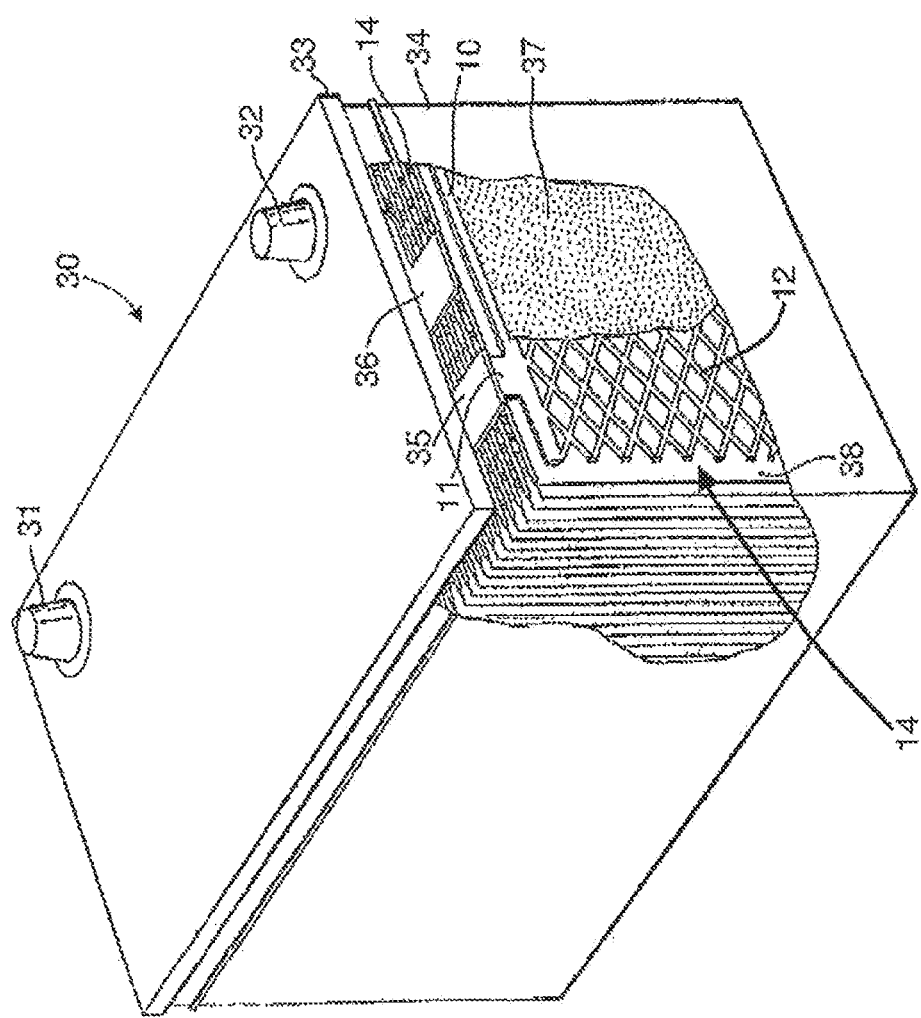
FIG. 3 a lead-acid battery.

FIG. 3 shows a lead-acid battery 30 having a plurality of electrode plates 14 of the above-described type. The lead-acid battery 30 comprises a cover part 33 having external terminals 31, 32. The external terminals 31, 32 are connected to respective positive/negative electrode plates via the respective pole bodies. The connecting lugs 11 of the negative electrode plates 14 are connected together by a negative electrode connector 35, the connecting lugs 11 of the positive electrode plates 14 are connected together by a positive electrode connector 36. The electrode connectors 35, 36 are formed in prior art accumulators by battery cell connectors described at the outset. In the case of the inventive accumulator, connecting lug blocks are respectively formed at this point instead.

The lead-acid battery 30 comprises a lower housing part 34 in which the electrode plates 14 are disposed. The electrode plates 14 are provided with a pasty active masse 37. Each electrode plate 14 including pasty active mass 37 is additionally encased in a separator material 38.

Figure 4:
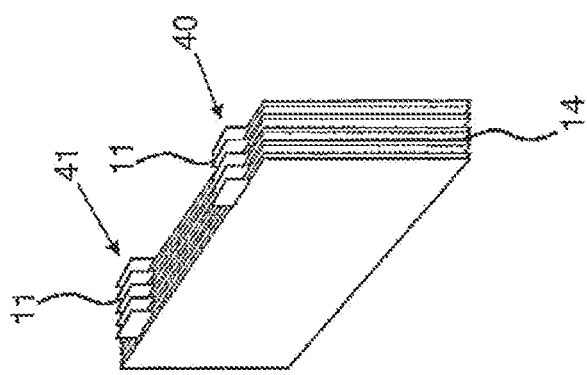
FIG. 4 an isometric view of a block-shaped electrode plate stack.

FIG. 4 shows a plurality of electrode plates 14 adjacently arranged at alternating polarity and forming an electrode plate stack in the form of a block. It can be recognized that the connecting lugs 11 of electrodes having the same polarity are adjacently arranged in a row such that two rows 40, 41 of connecting lugs are formed.

Figure 5:
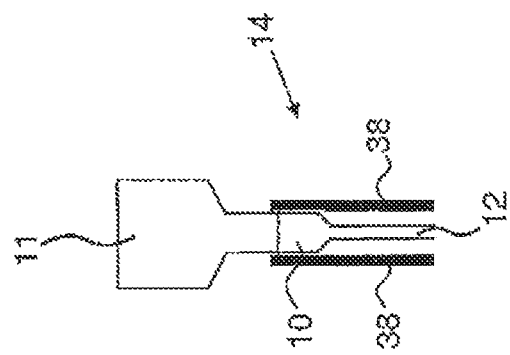
FIG. 5 a side view of the upper region of an electrode plate.

FIG. 5 is a side view example of the upper region of an electrode plate 14 showing the upper frame section 10 with the grid 12 beginning beneath it. The connecting lug 11 is disposed above the frame section 10 and is formed with a greater thickness in the example according to FIG. 5 than the frame or frame section 10 respectively. FIG. 5 shows an example of a thickening of the connecting lug 11 at the upper region of said connecting lug which is formed symmetrically to frame 10. The thickening can also be asymmetrical, in particular provided on one side, this being advantageous when the electrode plates are produced in a casting process. In this case, the upper thickened region of the connecting lug 11 is to be imagined as being shifted laterally to the left or right so as to result in a unilateral flush arrangement to the frames 9, 10. Doing so has no effect on the principle of joining the connecting lugs as described below.

The thickening of the connecting lug 11 is so strongly pronounced in this case that this area bridges the distance to an adjacent connecting lug of like polarity.

Separators 38 can be seen to the left and right of the upper frame section 10 and the grid 12.

FIG. 6 shows a side view of an electrode plate stack as follows from FIG. 4, wherein the respective electrode plates as formed as per FIG. 5. It can be seen that the thickened areas of the connecting lugs 11 of same-polarity electrode plates have virtually no interstices between them and thus directly join one another. Accordingly, the thickened areas of the connecting lugs of the electrode plates of opposite polarities which are further to the rear are not fully discernible per se, such that they are rendered in FIG. 6 by dotted lines.

The adjacently arranged connecting lugs 11 are now materially bonded together by welding or soldering. This can for example be realized by means of the respective outer connecting lugs being pressed together in response to forces acting thereon as per the arrows depicted in FIG. 6, e.g. by means of welding tongs. This directly presses all the connecting lugs 11 against each other so as to also render electrically conductive connections. The welding current now only needs to be switched on in the welding tongs and the connecting lug block 70 as seen in FIG. 7, into which the individual connecting lugs 11 are now joined, forms shortly thereafter.

The following will describe exemplary possibilities for connecting terminal connectors (battery cell connectors) and pole bodies for external terminals, based on the arrangement with the connecting lug block 70 depicted in FIG. 7, whereby it is pointed out that FIGS. 5 to 7 depict the electrode plates 14 and particularly the thickened areas of the connecting lugs 11 with exaggerated thicknesses for illustrative purposes. FIGS. 8 to 15 depict the same arrangement as in FIG. 7 although with more realistic proportions.

According to FIG. 8, as a result of the connecting lug block 70 now provided, a terminal connector 80 to now be newly designed is connected to the connecting lug block 70 by the terminal connector 80 being advanced to the connecting lug block 70 in the direction of the arrow depicted in FIG. 8 and subsequently soldered or welded to the connecting lug block 70 in for example the same way as described with respect to FIG. 6. The extended connecting lug block 70 as depicted in FIG. 9, to which the terminal connector 80 is materially fixed, then results.

Figure 8:
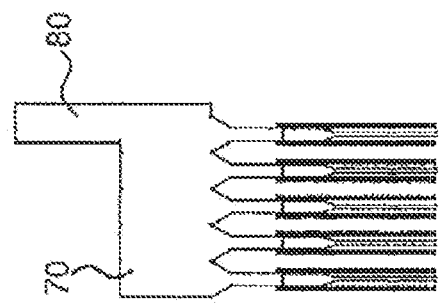
FIGS. 8-11 connecting a terminal connector to the connecting lug block.
Figure 9:
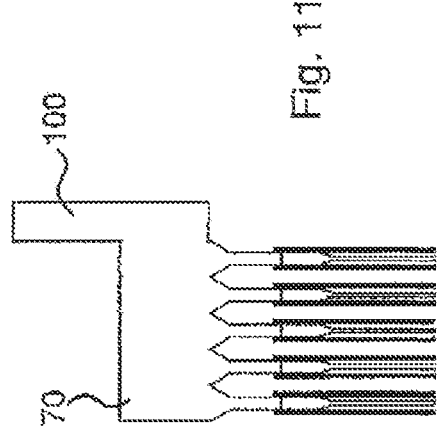
Figure 10:
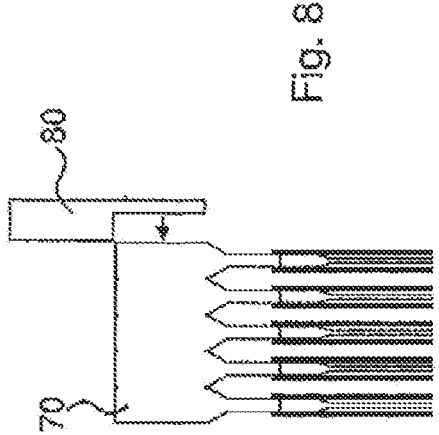
Figure 11:
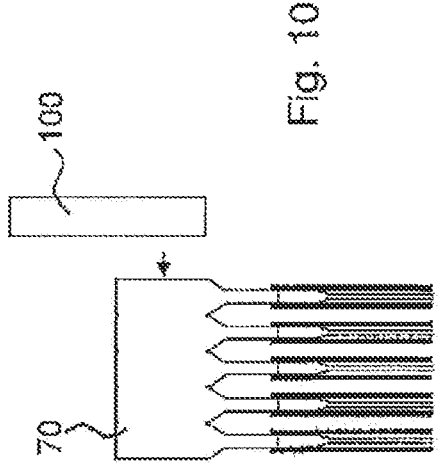

As can be seen, the terminal connector 80 according to FIG. 8 exhibits an angled region of lesser material thickness. The terminal connector 80 is joined to the connecting lug block 70 in this angled region. As per FIGS. 10 and 11, a simple block-shaped terminal connector 100 can also be connected to the connecting lug block 70 in the same way. The connecting lug block 70 lengthened by the terminal connector 100 as depicted in FIG. 11 then results.

FIGS. 12 to 15 show possibilities for connecting a pole body to the connecting lug block 70. Such a pole body serves to establish the electrical contact to an external terminal 31, 32 of the accumulator 30. The terminal 31, 32 is then positioned on the pole body and connected thereto by welding or soldering.

Figure 12:
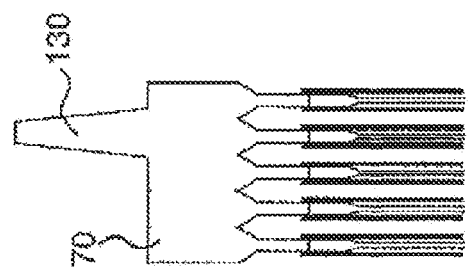
FIGS. 12-15 connecting a pole body to the connecting lug block.
Figure 13:
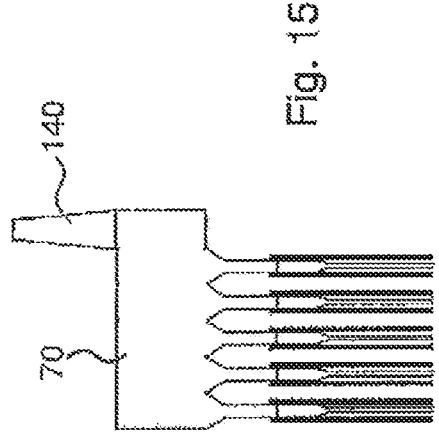

In one embodiment according to FIG. 12, a solder preform 120 is placed on the connecting lug block 70. The solder preform 120 is for example of conical shape so as to produce a conical pole body. Liquefied lead 121 is now introduced into the solder preform 120. The pole body being created is then "high-soldered" so to speak; i.e. filled with liquefied lead 121 until the solder preform 120 reaches the desired height for the pole body. FIG. 13 shows the resulting high-soldered pole body, namely a pole body 130 built atop the connecting lug block 70. Such a method has the advantage of the pole body 130 having a very secure hold on the connecting lug block and particularly offering greater stability and better current derivative values than the prior art solutions.

Figure 14:
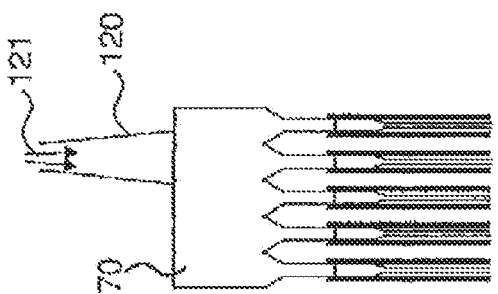
Figure 15:
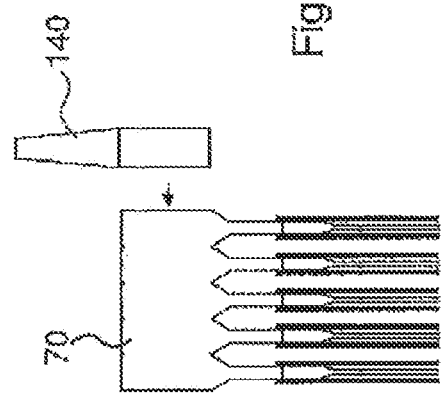

FIG. 14 shows a possibility for soldering or welding a prefabricated pole body 140 onto the side of the connecting lug block 70, as depicted by the arrow in FIG. 14. The structure as depicted in FIG. 15 with a pole body 140 materially coupled to the connecting lug block 70 then results.

Figure 16:
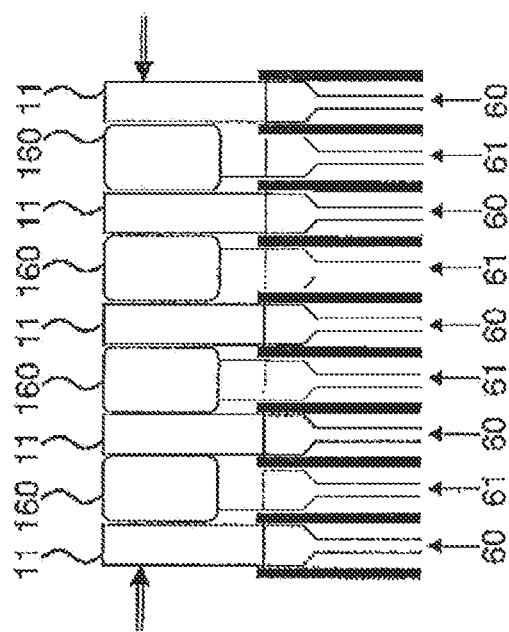
FIG. 16 adjacently arranged electrode plates prior to the connecting lug block being formed.
Figure 17:
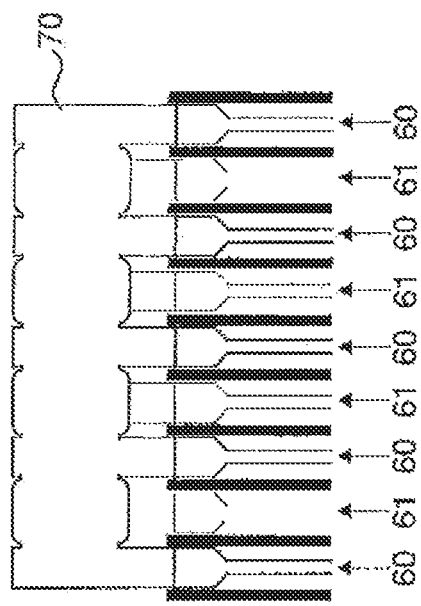
FIG. 17 the electrode plates according to FIG. 16 after the connecting lug block being formed.

FIGS. 16 and 17 depict an alternative formation of the connecting lug block 70. FIG. 16 starts again proceeds from an arrangement as per FIG. 6, although with the difference that electrode plates are provided in which the connecting lugs 11 are not thickened but have for example the same thickness as the frame 9, 10. Interstices thereby result between adjacent connecting lugs. These interstices are bridged by intermediary material layers 160 inserted in between them, e.g. in the form of spacer shims which can be made of lead. The intermediary material layers 160 can initially be clamped between the connecting lugs 11, for example. The procedure of welding or soldering the connecting lugs 11 into the connecting lug block 70 described above with reference to FIG. 6 follows thereafter, whereby the intermediary material layers 160 can also be soldered or welded at the same time and thereby also become a component of the connecting lug block 70, as can be seen in FIG. 17.

The invention claimed is:

1. An electrode plate comprising:
a frame having a frame thickness;
a grid arranged within the frame, the grid having a grid thickness;
a connecting lug protruding beyond the frame, the connecting lug having a lug thickness provided in an area forming a connecting lug block, the lug thickness being greater than the frame thickness and the frame thickness being greater than the grid thickness; and
a first portion of the electrode plate between the lug thickness and the frame thickness and a second portion of the electrode plate between the frame thickness and the grid thickness, the first portion having a first varying thickness from the lug thickness to the frame thickness and the second portion having a second varying thickness from the frame thickness to the grid thickness.

2. The electrode plate of claim 1 further comprising an active mass, wherein the grid is filled with a portion of the active mass.

3. The electrode plate of claim 1, wherein the first and second portions of the electrode plate are configured to gradually reduce the thickness of the electrode plate.

4. The electrode plate of claim 1, wherein the first and second portions of the electrode plate are configured to taper.

5. The electrode plate of claim 1, wherein the first and second portions of the electrode plate are sloped.

6. The electrode plate of claim 1, wherein the lug thickness is at least twice as great as the frame thickness.

7. An accumulator having the electrode plate of claim 1.

8. An accumulator comprising:
a cell;
an active mass; and
a plurality of electrode plates arranged adjacently within the cell to form an electrode plate stack, each electrode plate of the plurality of electrode plates comprising:
a frame having a frame thickness;
a grid arranged within the frame, the grid having a grid thickness and the grid being filled with a portion of the active mass;
a connecting lug protruding beyond the frame, the connecting lug having a lug thickness provided in an area forming a connecting lug block, the lug thickness being greater than the frame thickness and the frame thickness being greater than the grid thickness; and
a first portion of the electrode plate between the lug thickness and the frame thickness and a second portion of the electrode plate between the frame thickness and the grid thickness, the first portion having a first transitioning thickness from the lug thickness to the frame thickness and the second portion having a second transitioning thickness from the frame thickness to the grid thickness, wherein the connecting lug block of the plurality of electrode plates further includes an electrical and mechanical bond coupling each of the connecting lugs of same-polarity electrode plates.

9. The accumulator of claim 8, wherein the first and second portions of the electrode plate are configured to taper.

10. The accumulator of claim 8, wherein the first and second portions of the electrode plate include a sloped surface.

11. The accumulator of claim 8, wherein the lug thickness is at least twice as great as the frame thickness.

12. The accumulator of claim 8, further comprising a material bond coupling each of the connecting lugs of same-polarity electrode plates of the plurality of electrode plates.

13. The accumulator of claim 8, further comprising a resistance weld coupling each of the connecting lugs of same-polarity electrode plates of the plurality of electrode plates.

14. The accumulator of claim 8, further comprising a weld joint coupling each of the connecting lugs of same-polarity electrode plates of the plurality of electrode plates.

15. The accumulator of claim 8, further comprising a solder joint coupling each of the connecting lugs of same-polarity electrode plates of the plurality of electrode plates.

16. The accumulator of claim 8 further comprising a second cell adjacent the cell, wherein a terminal connector connecting the electrode plate stack of the cell to the electrode plate stack of the second cell is coupled to the connecting lug block.

17. The accumulator of claim 8, wherein a pole body of an external terminal of the accumulator is coupled to the connecting lug block.

* * * * *